United States Patent [19]

Kirchner

[11] Patent Number: 5,099,768
[45] Date of Patent: Mar. 31, 1992

[54] SWIVEL TABLE

[75] Inventor: Balthasar Kirchner, Eferding, Austria

[73] Assignee: Ernst Stadelmann Gesellschaft m.b.H., Bahnhofstrasse, Austria

[21] Appl. No.: 714,331

[22] Filed: Jun. 11, 1991

Related U.S. Application Data

[63] Continuation of Ser. No. 453,698, Dec. 20, 1989, abandoned.

[30] Foreign Application Priority Data

Jan. 4, 1989 [AT] Austria .................................. A17/89

[51] Int. Cl.$^5$ ........................................... A47B 11/00
[52] U.S. Cl. .................................. 108/138; 248/286; 248/333; 108/139
[58] Field of Search ............... 108/138, 139, 140, 141, 108/142, 150, 149; 248/158, 188.5, 337, 338, 287, 333, 285, 286, 917, 918, 920; 312/196

[56] References Cited

U.S. PATENT DOCUMENTS

| 222,793 | 12/1879 | Le Valley | 248/287 |
| 895,833 | 8/1908 | Aurgst | 248/285 |
| 1,288,611 | 12/1918 | Jones | 248/285 |
| 1,823,214 | 9/1931 | Scriven et al. | 108/140 |
| 1,908,136 | 5/1933 | Fox | 248/286 |
| 2,114,973 | 4/1938 | Wulf | 248/333 |
| 2,151,877 | 3/1939 | Walker | 248/286 |
| 2,193,647 | 3/1940 | Rusti et al. | 108/139 |
| 3,345,470 | 10/1967 | Hoffmannn | 248/285 |

FOREIGN PATENT DOCUMENTS

| 0218498 | 2/1910 | Fed. Rep. of Germany | 248/286 |
| 2051104 | 4/1972 | Fed. Rep. of Germany | . |
| 2717290 | 10/1978 | Fed. Rep. of Germany | . |
| 2356388 | 1/1976 | France | 312/7 |
| 0356282 | 9/1961 | Switzerland | 248/188.5 |
| 663881 | 1/1988 | Switzerland | . |
| 0028112 | of 1897 | United Kingdom | 108/139 |

Primary Examiner—Gerald A. Anderson
Attorney, Agent, or Firm—Herbert Dubno; Andrew Wilford

[57] ABSTRACT

A swivel table, particularly for carrying a telephone, comprises a swivel column, which is provided at one end with a foot part, which is adapted to be secured to a carrying structure, and is provided at its other end with a head part, to which an outwardly and downwardly inclined swivel arm is connected, which carries an adjustable swivel table top. In order to reduce the manufacturing costs and to increase the stability and to ensure a more convenient use of the swivel table, the head part is rigidly mounted on the swivel column and is provided with an outwardly and downwardly inclined telescopic swivel arm, which is adjustable in length.

17 Claims, 3 Drawing Sheets

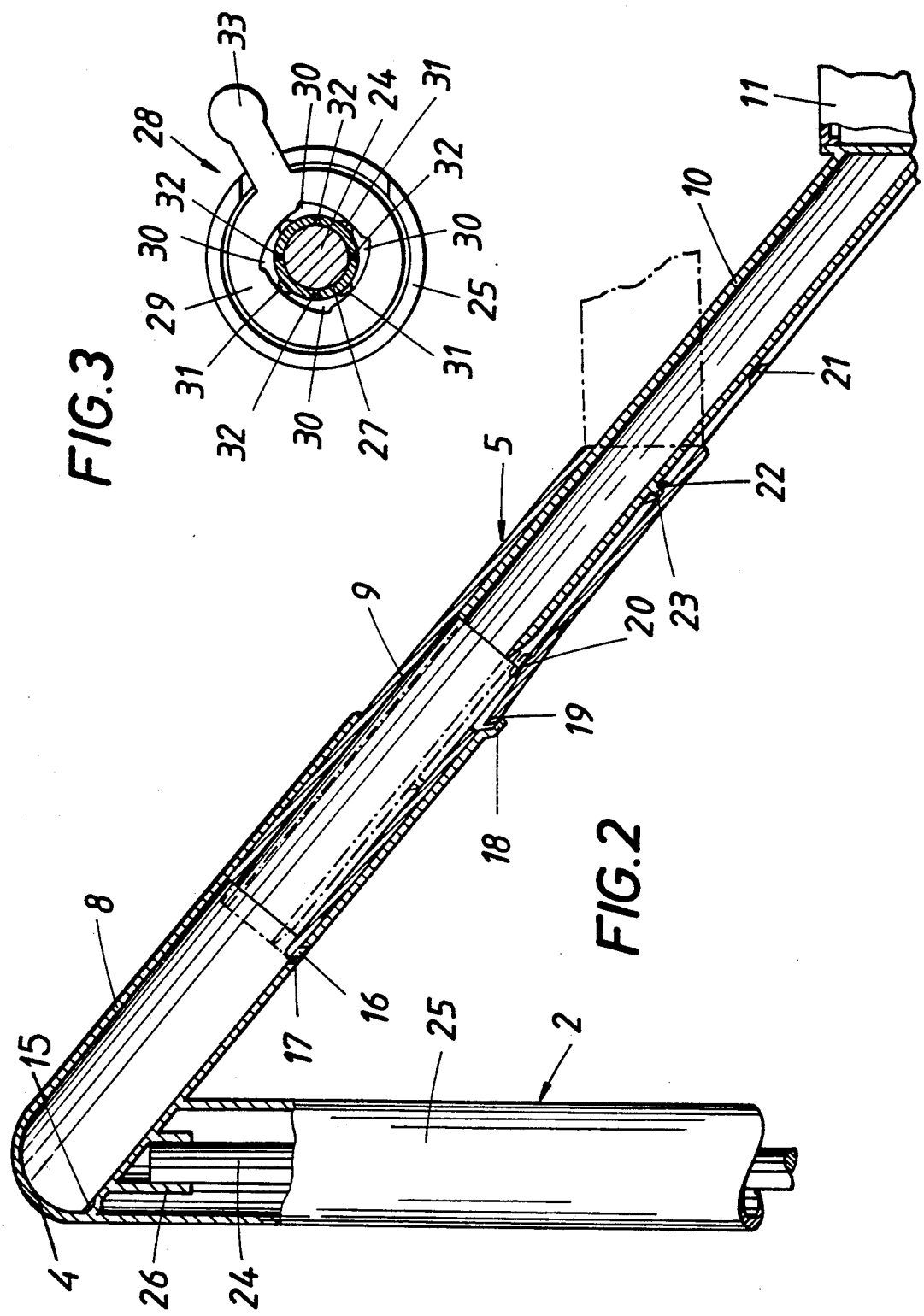

SWIVEL TABLE

This is a continuation of co-pending application Ser. No. 07/453,698 filed on Dec. 20, 1989, now abandoned.

BACKGROUND OF THE INVENTION

1. Field of the Invention

This invention relates to a swivel table, particularly for carrying a telephone, comprising a swivel column which is provided at one end with a foot part which is adapted to be secured to a carrying structure and is provided at its other end with a head part to which an outwardly and downwardly inclined swivel arm is connected which carries an adjustable swivel table top.

2. Background of the Invention

Such swivel tables are intended to save space on a desk and to avoid an occupation of desk top surface area by telephones, dictating machines and other office utensils and to provide a movable support for such items so that they can be handled more conveniently and used in an improved manner. Besides, such swivel tables actually provide an additional working level above the desk and because they are movable permit the items provided on that level to be used by a plurality of persons. In most known swivel tables the swivel table top is mounted on a swivel arm which is mounted on a wall surface or on a column and consists of a rigid tube or of lazy tongs so that the swivel table top is movable only on a predetermined level. As a result, the items carried by such swivel tables are either sufficiently spaced above the desk and in that case cannot easily be grasped by the user or they are closely spaced above the desk top and in that case the movement of the items will be obstructed by other articles placed on the desk or the items undesirably restrict the free surface area which is available on the desk top.

DE-B2-20 51 104 discloses a swivel table in which the swivel table top is carried by two parallel-motion linkages so that the freedom of movement is considerably increased but all links must move during any movement of the swivel table top. As a result, such swivel tables require a large space and owing to the large number of movable parts are expensive and rather unstable. DE-C2-27 17 290 discloses a swivel table in which the swivel table top is carried by a downwardly inclined swivel arm, which is linked to the swivel column by a parallel-motion linkage. In that case a movement of the swivel table top will not affect the space between the swivel arm and the swivel table top, on the one hand, and the swivel column, on the other hand, but the links of the parallel-motion linkage and the counter-balancing spring which is required considerably add to the manufacturing costs and render the arrangement rather unstable.

SUMMARY OF THE INVENTION

It is an objective of the invention to eliminate these disadvantages and to provide a swivel table which is of the kind described first hereinbefore and which distinguishes itself by having a high strength and by being conveniently usable and which can be economically manufactured and whereas it has a large range it will occupy only a small space.

This objective is accomplished in accordance with the invention in that the head part is rigidly mounted on the swivel column and is provided with an outwardly and downwardly inclined telescopic swivel arm which is adjustable in length. The resulting swivel table comprises no hinge and consists only of a few parts which can be manufactured and assembled at low cost and constitute as a support for a telephone or the like a swivel table which has high strength and a high carrying capacity. Since the telescopic swivel arm is outwardly and downwardly inclined and is adjustable in length and the swivel column is rotatable, the freedom of movement of the swivel table top provided at the free end of the swivel arm will meet all requirements. Items carried by the swivel table top can conveniently be moved to and from a desired position for use since the item or the swivel table top is pulled or pushed by the user. When the telephone is pulled by a user, the swivel table top will be constrained by the telescopic swivel arm to move in an outwardly and downwardly inclined direction so that the surface area on the desk top extending below the swivel arm as far as to the swivel column will not be affected. For a swiveling of the swivel table the telescopic swivel arm will be reduced in length so that the swivel table top will be raised and moved closer to the swivel column. As a result, the range in which the swivel table can be swiveled will not be restricted even when the table top is fully occupied. The friction between the parts of the telescopic swivel arm may properly be selected and/or suitable indentations and detent and stop elements may be provided to permit an infinite adjustment of the swivel table top and a definition of end and intermediate positions regardless of whether the foot part is designed to be clamped to a desk top or to be secured to a wall. As a result the swivel table is functionally satisfactory, has a pleasing appearance and may be moved within a desired range selected within ergonomic aspects.

Within the scope of the invention, the head part consists of a tube which is integrally formed with the swivel column and extends at an acute angle thereto and which is integral with the innermost of three telescopic parts of the telescopic swivel arm. The swivel table and has a high structural stability and may be made of plastic.

To prevent an unintended rotation of the swivel table top about the longitudinal axis of the telescopic swivel arm and to ensure that the telescopic parts will be exactly guided, the tube and the telescopic parts have a non-circular, and preferably oval cross-section.

The freedom of movement may be increased within the scope of the invention in that the swivel table top is pivoted on a vertical axis to a bracket, which is carried by the outer end of the telescopic swivel arm. Alternatively or in addition the swivel table top may be pivoted to the bracket or/and the bracket may be pivoted to the outer end of the telescopic swivel arm on a vertical axis so that a telephone or other item placed on the swivel table top may moved to a desired position and can be used conveniently. It will be understood that the swivel table top may be provided with U-shaped members for retaining the item to be carried thereby and with a handle so that the item to be carried will reliably be held on the swivel table top and the latter can easily be grasped and handled.

In an embodiment within the scope of the invention the swivel column comprises a tubular sheath and an axle, which is non-rotatably fixed to the foot part and defines an axis of rotation, and the tubular sheath is rotatably mounted on the axle by means of bearing bushings and is preferably provided with clamping means. The axle is preferably made of metal and will increase the stability and the carrying capacity of the swivel table and permits the use of a tubular sheath which is functionally satisfactory, and has a pleasing appearance. The assembling of the swivel table is facilitated by using an axle and the clamping means may be used to brake to prevent swiveling.

The clamping means may comprise an adjustable ring which is pivotally mounted in the tubular sheath, accessible from outside the tubular sheath and surrounds one of the bearing bushings. The clamping means is formed in its inside peripheral surface with eccentric recesses and cooperates with resiliently depressible, radial projections provided on the outside peripheral surface of the associated bearing bushing. The bushing is preferably formed with axial slots adjacent to the brake ring. This clamping means is simple and effective and a rotation of the brake ring will have the result that the bearing bushing is radially more or less compressed and the swiveling is more or less braked.

BRIEF DESCRIPTION OF THE DRAWINGS

The above and other objects, features, and advantages of the instant invention will become apparent from the following description, reference being made to the accompanying drawing in which:

FIG. 2 is a partial side view mainly in vertical section through the swivel table in extended condition; and FIG. 3 is a section taken along line III—III of FIG. 1.

DETAILED DESCRIPTION OF THE PREFERRED EMBODIMENT

Figure 1:
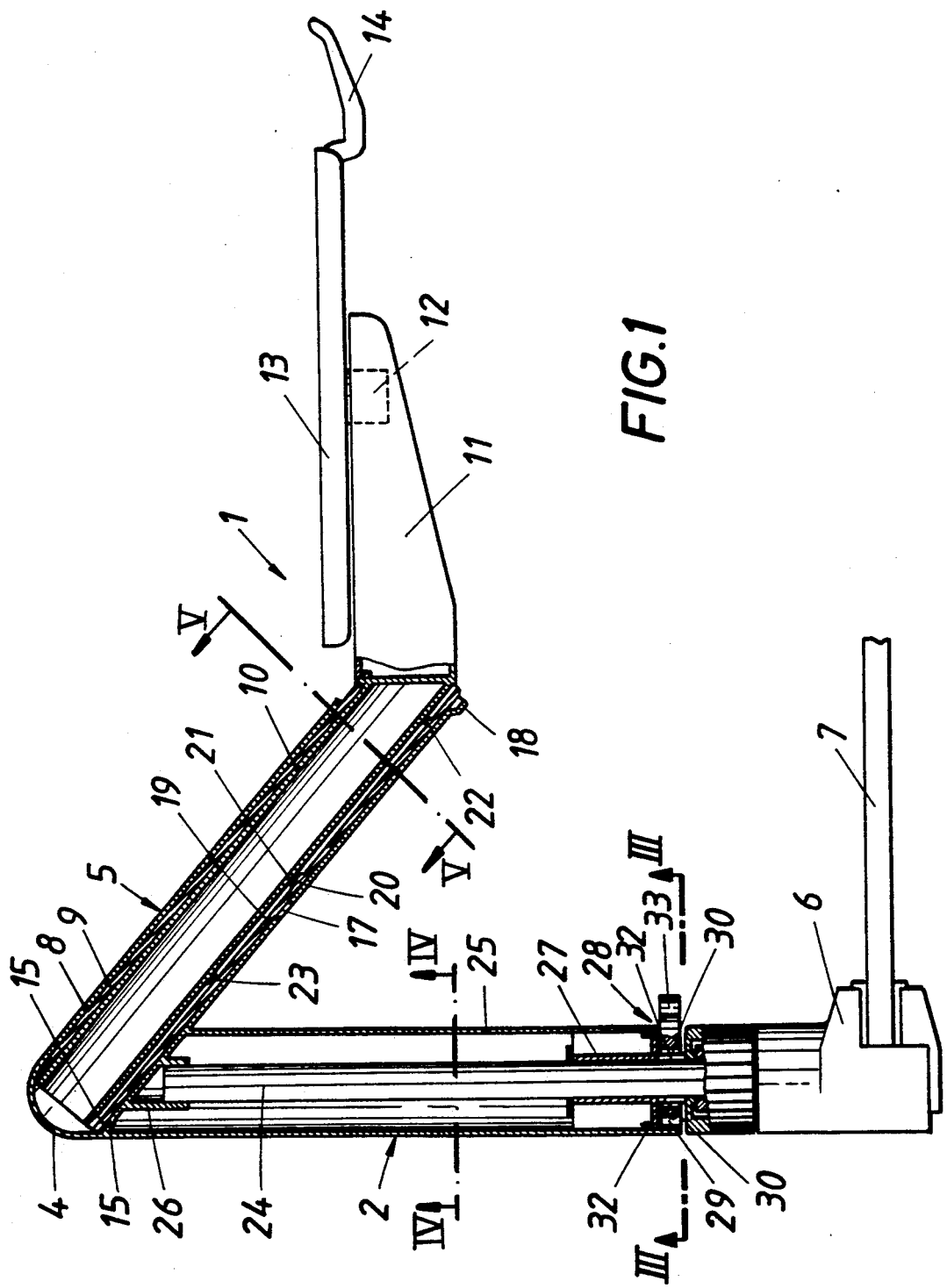
FIG. 1 is a side view partly in vertical section of the swivel table of this invention is pushed-back condition.

The invention will now be described with reference to the drawings.

The swivel table 1 for carrying a telephone comprises a swivel column 2 which is provided at its bottom end with a foot part 3 and at its top end with a head part 4. The head part is connected to an outwardly and downwardly inclined telescopic swivel arm 5. The foot part 3 consists of a screw clamp 6, which secures the table 1 to a desk top 7. Alternatively, the foot part 3 might comprise a flange, which is adapted to be fixed by screws to a table top or to a wall. The head part 4 comprises a tube 8 which is integrally formed with and downwardly inclined from the swivel column 2 at an acute angle thereto and is the innermost part of the telescopic swivel arm 5. The telescopic swivel arm 5 is composed of three parts, namely, the innermost part, which is the tube 8, an intermediate part 9 and an outer end part 10 which carries a bracket 11 having a pivotal mount 12 for pivotally mounting a swivel table top 13 on a vertical axis. The swivel table top 13 may be used to carry a telephone. The swivel table top 13 is provided with a handle 14 so that the swivel table 1 and particularly its swivel table top 13 can be handled more conveniently. The handle 14 may also be used to support the receiver of a telephone.

Figure 4:
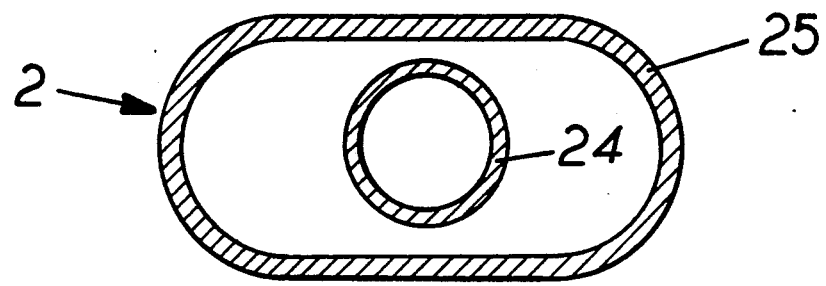
Figure 5:
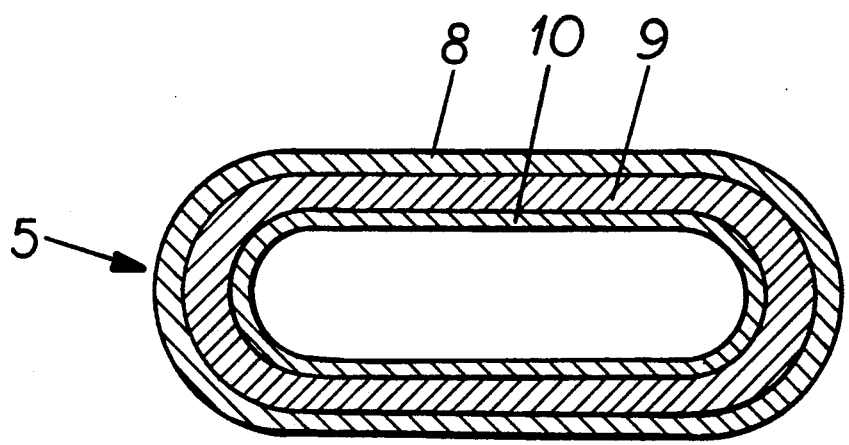

To prevent a tilting of the bracket 11 about the longitudinal axis of the swivel arm the parts 8, 9, 10 have an oval or polygonal cross-section (FIGS. 4 and 5). The parts 8, 9, 10 are provided with suitable indentations and detent and stop elements 15, 16, 17, 18, 19, 20, 21, 22, 23, which limit the extent to which the telescopic swivel arm 5 can be extended and define three positions of which the telescopic swivel arm can be maintained. The length of the telescopic swivel arm 5 and the position of the swivel table top 13 can be adjusted between the stops and detents. Friction between the parts may be so great that the parts are self-locking and the adjusted length of the telescopic swivel arm 5 will be maintained even when the swivel table top 13 is under a rather high load.

By means of telescoping action the swivel table top 13 and the telephone or other item carried thereby can conveniently be moved in the longitudinal direction of the telescopic swivel arm 5. The swivel table top 13 may be pulled by the user toward himself and moved closer to the desk top for convenient use or the swivel table top may be pushed back by the user so that the telescopic swivel arm 5 will be shortened and the swivel table top and the telephone thereon will be raised from the desk top 7 exposing valuable working surface area on the desk top.

The telescopic swivel arm 5 is mounted on the swivel column 2 so that that swivel table top 13 be moved in the longitudinal direction of the swivel arm and rotated about the axis of rotation defined by the column. Thus the swivel table 1 has a large freedom of movement. To ensure a stable support the swivel column 2 comprises an axle 24 which is non-rotatably connected to the foot part 3 by means which are not shown, and a tubular part 25 which is integral with the head part 4 and tube sheath 25 and is fitted on the axle 24 with bearing bushings 26, 8 and 27. A clamping device 28 is provided, by which the rotation of the tubular sheath 25 about the axle 24 can be braked to any desired degree or locked in a desired angular position.

The clamping device 28 consists of an brake ring 29, which is rotatably mounted in a bottom end portion of the tubular sheath 25, is accessible from the outside of the tubular sheath and surrounds a protruding portion of the bearing bushing 27. The clamping device is formed with an inside peripheral surface having eccentric recesses 30. These recesses cooperate with peripherally spaced apart, radially depressible, bosslike radial projections 31 provided on the outside peripheral surface of the bearing bushing 27. In order to increase the elasticity of the bearing bushing 27, axial slots 32 are formed in the bearing bushing 27 between adjacent projections 31. The brake ring 29 is rotatable by means of a brake lever 33 so that the eccentric recesses 30 cooperate with the projections 31 to compress that portion of the bearing bushing which is disposed within the brake ring 29 and the rotation of the tubular sheath 25 about the axle 24 will thus be braked or locked.

The swivel table 1 in accordance with the invention has a high degree of stability, can be manufactured at low cost, requires only a small space, can conveniently be used, and has a pleasing functional appearance.

I claim:

1. A swivel table and support structure, comprising:
   means for mounting said table and structure to a carrying structure,
   a swivel column defining an upright axis of rotation and having top and bottom ends,
   said means including a foot section supporting said bottom end of said swivel column,
   a head part at said top end of said swivel column,
   a swivel arm which has an inner end adjacent said head part and an outer end adjacent said swivel table, and said swivel arm is outwardly and downwardly inclined from said inner end to said outer end, and
   said swivel table which is horizontally carried by said swivel arm at said outer end thereof, and said swivel arm which is connected to said column are provided with freedom of rotation about said axis of rotation by said mounting means supporting said column, and the improvement that said swivel arm is nonrotatably connected to said head part, said head part is nonrotatably connected to said colummn at said top end thereof, said head part is connected to said mounting means for rotation about said axis of rotation, and said swivel arm is telescopic and is formed by
an inner telescope part fixed to said head part, and
an outer-telescope part telescoping relative to said inner telescope part, said swivel table being fixed only on said outer telescope part, whereby said outer telescope part does telescope out of said inner telescope part displacing said table vertically and horizontally while maintaining said swivel table horizontally level.

2. The improvement set forth in claim 1 wherein said foot section comprises means for securing said foot section to the carrying structure.

3. The improvement set forth in claim 1 wherein said head part consists of a tube which is integrally formed with said swivel column and said inner telescoped part and is outwardly and downwardly inclined at an acute angle to said axis of rotation.

4. The improvement set forth in claim 3 wherein said swivel arm comprises two such outer telescoped parts.

5. The improvement set forth in claim 1 wherein said swivel arm carries a bracket at its outer end and said swivel table is pivoted to said bracket on a vertical axis.

6. The improvement set forth in claim 1 wherein said swivel columnm comprises a tubular sheath which is connected to said head part, and an axle which is nonrotatably connected to said foot section and said tubular sheath is rotatably mounted on said axle by means of bearing bushings interposed between said sheath and said axle.

7. The improvement set forth in claim 6 wherein clamping means are provided for clamping said tubular sheath against said axle.

8. A swivel table adapted to be mounted on a carrying structure and comprising;
a swivel column extending along an upright axis of rotation and comprising
an upright axle defining the axis and
a tubular sheath surrounding the axle
bearings supporting the sheath on the axle for rotation thereon about the axis,
a foot part fixed at the bottom end of the axle and adapted to be secured to the carrying structure,
a head part fixed at the top end of the sheath,
a telescopic and length-adjustable swivel arm having an inner end fixed to the head part and an outer end and outwardly and downwardly inclined from the inner end to the outer end,
a swivel table carried by the swivel arm at the outer end thereof, and
clamping means for clamping the tubular sheath against the axle comprising
an adjusting ring which is rotatably mounted in said tubular sheath and accessible from the outside and surrounds one of said bearings and has an inside peripheral surface formed with eccentric recesses and
an outside peripheral surface on the one bearing facing said inside peripheral surface of said adjusting ring and provided with peripherally spaced apart radial projections which are adapted to be engaged and to be resiliently radially depressed by said adjusting ring on said inside peripheral surface and to enter said eccentric recesses.

9. The improvement set forth in claim 8 wherein said one bearing is formed with axial slots between adjacent ones of said projections.

10. A swivel table adapted to be mounted on a carrying structure and comprising:
a swivel column extending along an upright axis of rotation and having
an upright axle centered on the axis and having top and bottom ends,
a tube generally coaxially surrounding the axle and having top and bottom ends at the respective ends of the axle, and
bearings supporting the tube on the axle for rotation thereon about the axis;
a foot fixed at the bottom end of the axle and adapted to be secured to the carrying structure;
a head fixed at the top end of the tube;
a telescopic and length-adjustable swivel arm having an upper inner end fixed to the head and a lower outer end, the arm being outwardly and downwardly inclined from the inner end to the outer end, the outer arm end moving down and away from the axis on telescopic expansion of the arm, and
a horizontal swivel table fixed on the swivel arm at the outer end thereof.

11. The improvement set forth in claim 10 wherein the foot comprises means for securing the foot to the carrying structure.

12. The improvement set forth in claim 10 wherein the head consists of a tube which is integrally formed with the swivel column and the tube comprises a pair of telescoped parts one of which is fixed to the head.

13. The improvement set forth in claim 12 wherein the swivel arm comprises three such telescoped parts.

14. The improvement set forth in claim 10 wherein the swivel arm carries a bracket at its outer end and the swivel table is rotatably mounted to the bracket about a vertical axis.

15. The improvement set forth in claim 10 further comprising means for clamping the tube against the axle.

16. The improvement defined in claim 15 wherein the clamping means includes:
an adjusting ring which is rotatably mounted in the tube and accessible from the outside and surrounds one of the bearings and has an inside peripheral surface formed with eccentric recesses and
an outside peripheral surface on the one bearing facing the inside peripheral surface of the adjusting ring and provided with peripherally spaced apart radial projections which are adapted to be engaged and to be resiliently radially depressed by the adjusting ring on the inside peripheral surface and to enter the eccentric recesses.

17. The improvement set forth in claim 16 wherein the one bearing is formed with axial slots between adjacent ones of the projections.

* * * * *